ized on a back portion of the vehicle and identifying one or more
United States Patent
Li et al.

(10) Patent No.: US 10,906,583 B2
(45) Date of Patent: Feb. 2, 2021

(54) AUTONOMOUS TRAILER HITCHING USING NEURAL NETWORK

(71) Applicant: Continental Automotive Systems, Inc., Auburn Hills, MI (US)

(72) Inventors: Dalong Li, Rochester Hills, MI (US); Keja Rowe, Southfield, MI (US); Ibro Muharemovic, Warren, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 248 days.

(21) Appl. No.: 15/909,819

(22) Filed: Mar. 1, 2018

(65) Prior Publication Data

US 2018/0251153 A1    Sep. 6, 2018

Related U.S. Application Data

(60) Provisional application No. 62/466,824, filed on Mar. 3, 2017.

(51) Int. Cl.

| | |
|---|---|
| *B62D 13/06* | (2006.01) |
| *G05D 1/00* | (2006.01) |
| *B62D 15/02* | (2006.01) |
| *B60D 1/36* | (2006.01) |
| *B60D 1/62* | (2006.01) |
| *B60D 1/06* | (2006.01) |
| *G05D 1/02* | (2020.01) |

(52) U.S. Cl.
CPC ............... *B62D 13/06* (2013.01); *B60D 1/06* (2013.01); *B60D 1/36* (2013.01); *B60D 1/62* (2013.01);

(Continued)

(58) Field of Classification Search
CPC ....... B62D 13/06; B62D 15/0285; B60D 1/06; B60D 1/36; B60D 1/62; G05D 1/0088;

(Continued)

(56) References Cited

U.S. PATENT DOCUMENTS

| | | | | |
|---|---|---|---|---|
| 7,429,051 B2 * | 9/2008 | Bauer | ................... | B60D 1/36 |
| | | | | 280/6.15 |
| 7,813,844 B2 * | 10/2010 | Gensler | .............. | B62D 15/0285 |
| | | | | 701/1 |

(Continued)

FOREIGN PATENT DOCUMENTS

| | | |
|---|---|---|
| DE | 102012001380 A | 8/2012 |
| EP | 3081405 A2 | 10/2016 |

OTHER PUBLICATIONS

International Search Report and the Written Opinion of the International Searching Authority dated Jun. 13, 2018 for corresponding patent application PCT/US2018/020655.
European Patent Office Exam Report dated Nov. 24, 2020 for the counterpart European Patent No. 18 710 746.1.

*Primary Examiner* — Nicholas Kiswanto

(57) ABSTRACT

A method of maneuvering a vehicle in reverse for attachment to a trailer is disclosed. The method includes receiving one or more images from one or more cameras positioned on a back portion of the vehicle and identifying one or more trailers within the one or more images. The method also includes receiving an indication of a selected trailer from the one or more trailers. Additionally, the method includes determining a vehicle path from an initial position to a final position. The vehicle path includes maneuvers configured to direct the vehicle in a rearward direction along the vehicle path from the initial position to the final position. The method also includes executing one or more behaviors causing the vehicle to take an action to autonomously follow the vehicle path and execute the maneuvers.

18 Claims, 10 Drawing Sheets

(52) U.S. Cl.
CPC ....... *B62D 15/0285* (2013.01); *G05D 1/0088* (2013.01); *G05D 1/0225* (2013.01); *G05D 1/0246* (2013.01); *G05D 2201/0213* (2013.01)

(58) Field of Classification Search
CPC .............. G05D 1/0225; G05D 1/0246; G05D 2201/0213
See application file for complete search history.

(56) References Cited

U.S. PATENT DOCUMENTS

| | | | |
|---|---|---|---|
| 9,499,018 B2 * | 11/2016 | Gehrke | B60D 1/06 |
| 9,696,723 B2 * | 7/2017 | Zeng | G05D 1/0212 |
| 9,731,568 B2 * | 8/2017 | Wuergler | B60R 1/00 |
| 2005/0074143 A1 * | 4/2005 | Kawai | B62D 13/06 |
| | | | 382/104 |
| 2009/0236825 A1 * | 9/2009 | Okuda | B60D 1/36 |
| | | | 280/477 |
| 2013/0226390 A1 * | 8/2013 | Luo | B60D 1/36 |
| | | | 701/25 |
| 2015/0321666 A1 * | 11/2015 | Talty | G05D 1/0259 |
| | | | 701/41 |
| 2016/0052548 A1 * | 2/2016 | Singh | B60D 1/36 |
| | | | 701/37 |
| 2019/0335100 A1 * | 10/2019 | Chen | B60R 1/00 |

* cited by examiner

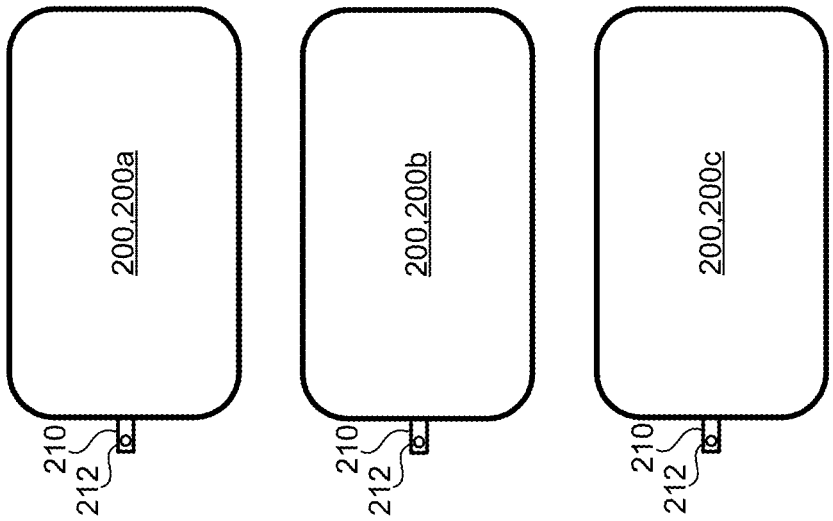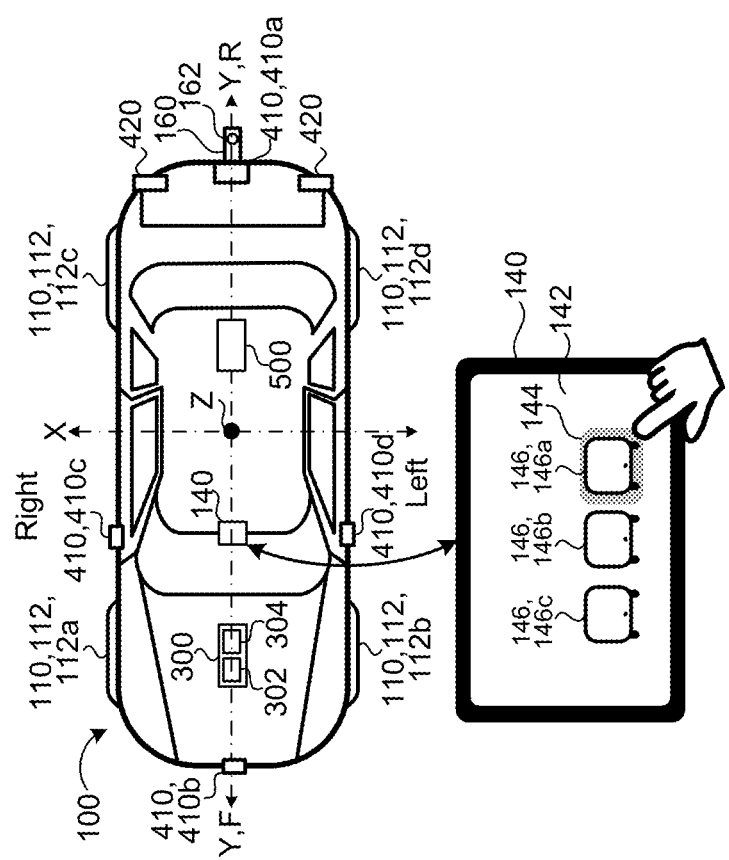
FIG. 1

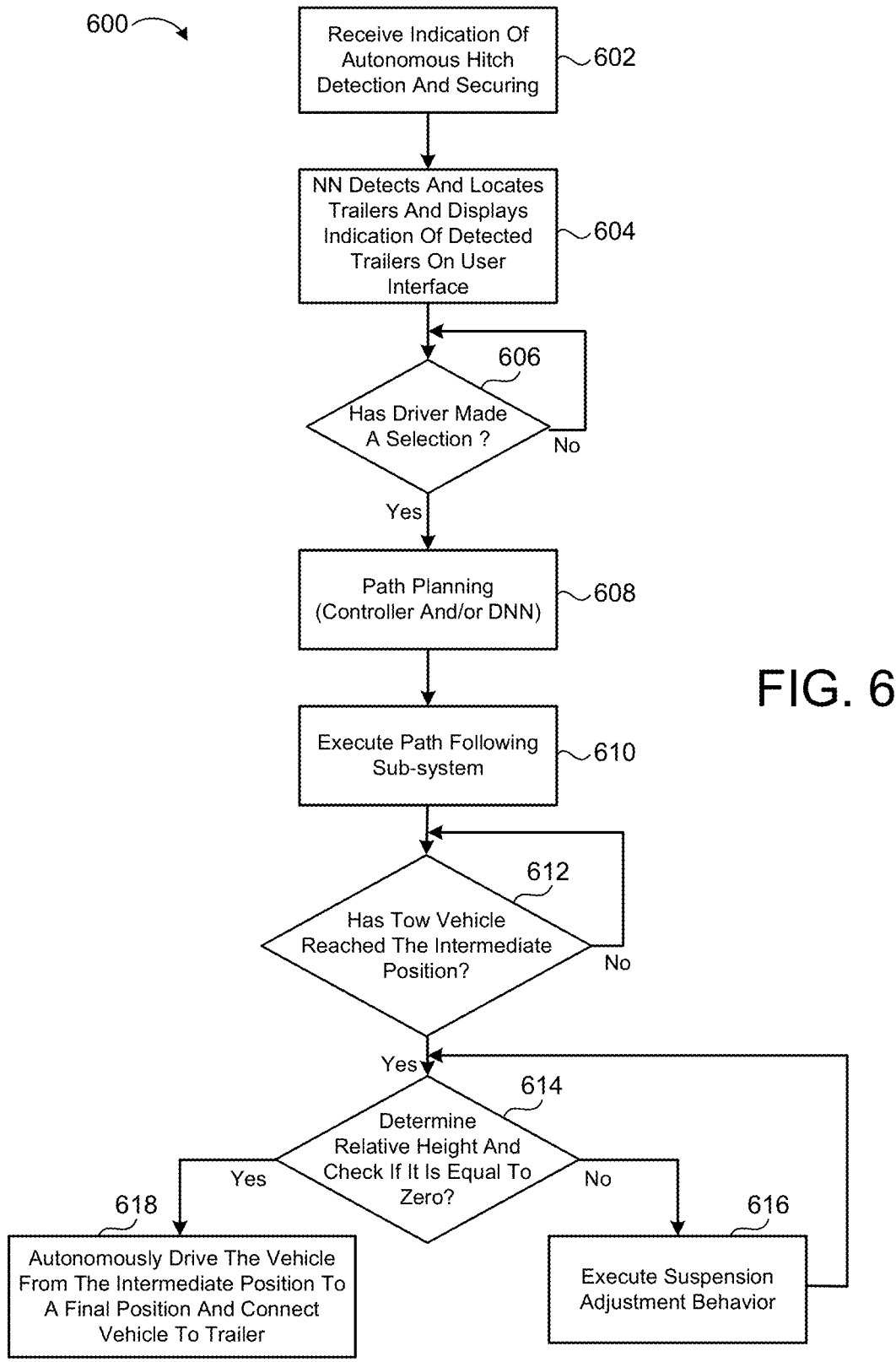

AUTONOMOUS TRAILER HITCHING USING NEURAL NETWORK

CROSS REFERENCE TO RELATED APPLICATIONS

This U.S. patent application claims priority under 35 U.S.C. § 119(e) to U.S. Provisional Application 62/466,824, filed on Mar. 3, 2017, which is hereby incorporated by reference in its entirety.

TECHNICAL FIELD

This disclosure relates to an automotive vehicle configured to identify one or more trailers positioned behind the automotive vehicle and drive to one of the one or more trailers.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Some of the challenges that face tow vehicle drivers are connecting the tow vehicle to the trailer, because more than one person is needed. For example, one person drives the vehicle, e.g., the driver, and another one or more people are needed to view the tow vehicle and the trailer and provide the driver with direction regarding the path the tow vehicle has to take to align with the hitch. If the people providing directions to the driver are not accustomed to hitching a tow vehicle to a trailer, then they may have difficulty providing efficient instructions for directing the path of the tow vehicle.

Recent advancements in sensor technology have led to improved safety systems for vehicles. Arrangements and methods for detecting and avoiding collisions are becoming available. Such driver assistance systems use sensors located on the vehicle to detect an ongoing collision. In some examples, the system may warn the driver of one or more driving situations to prevent or minimize collisions. Additionally, sensors and cameras may also be used to alert a driver of possible obstacles when the vehicle is traveling in a forward direction. Therefore, it is desirable to provide a system that includes sensors to overcome the challenges faced by drivers of tow vehicles.

SUMMARY

One aspect of the disclosure provides a method of maneuvering a vehicle in reverse for attachment to a trailer. The method includes receiving, at a computing device (e.g., a controller and a deep neural network in communication with the controller), one or more images from one or more cameras positioned on a back portion of the vehicle. The method also includes identifying, by the computing device, one or more trailers within the one or more images. In addition, the method includes receiving, at a computing device, an indication of a selected trailer from the one or more trailers. In some examples, the computing device is in communication with a user interface configured to receive the indication of the selected trailer. The method also includes determining, at the computing device, a vehicle path from an initial position to a final position. The vehicle path includes maneuvers configured to move the vehicle in a rearward direction along the vehicle path from the initial position to the final position. The method also includes executing, by the computing device, one or more behaviors causing the vehicle to take an action to autonomously follow the vehicle path and execute the maneuvers.

Implementations of this aspect of the disclosure may include one or more of the following optional features. In some implementations, the one or more behaviors include a braking behavior, a speed behavior, a steering behavior, a hitch connect behavior, and a suspension adjustment behavior.

In some examples, the method includes: receiving, at the computing device, one or more sensor data from a sensor system in communication with the computing device; detecting, by the computing device, one or more objects along or adjacent to the vehicle path from the sensor data; and adjusting, by the computing device, the vehicle path based on the one or more objects. The vehicle path may include the initial position, an intermediate position, and the final position. The intermediate position having a distance to the final position being less than a distance between the intermediate position and the initial position. In some examples, at the intermediate position, the trailer is in an orientation aligned generally parallel with the trailer and facing away from the trailer.

In some implementations, the method includes at the final position, determining, by the computing device an adjustment height. The adjustment height being a height that the vehicle has to be raised for a hitch coupler of the trailer to receive a tow vehicle hitch ball. The method also includes sending, from the computing device to a suspension system of the vehicle, a command to adjust a vehicle suspension based on the adjustment height.

Another aspect of the disclosure provides a vehicle for maneuvering in reverse along a path for attachment to a trailer. The vehicle includes one or more cameras positioned on a back portion of the vehicle, and a computing device (e.g., a controller and a deep neural network in communication with the controller) in communication with a user interface. The vehicle also includes non-transitory memory in communication with the computing device. The non-transitory memory stores instruction that when executed on the computing device cause the computing device to perform operations. The operations include: receiving one or more images from the one or more cameras; identifying one or more trailers within the one or more images and receiving an indication of a selected trailer from the one or more trailers. The indication is indicative of a driver selection by way of a user interface. The operations also include determining a vehicle path from an initial position to a final position. The vehicle path includes maneuvers to move the vehicle in a rearward direction along the vehicle path from the initial position to the final position. The operations also include executing one or more behaviors causing the vehicle to take an action to autonomously follow the vehicle path and execute the maneuvers.

Implementations of this aspect of the disclosure may include one or more of the following optional features. In some implementations, the one or more behaviors include a braking behavior, a speed behavior, a steering behavior, a hitch connect behavior, and a suspension adjustment behavior.

In some implementations, the operations further include receiving one or more sensor data from a sensor system in communication with the computing device, and detecting one or more objects along or adjacent to the vehicle path from the sensor data. The operations may further include adjusting the vehicle path based on the one or more objects.

In some examples, the vehicle path includes the initial position, an intermediate position, and the final position. The intermediate position has a distance to the final position being less than a distance between the intermediate position and the initial position.

In some implementations, at the intermediate position, the trailer is in an orientation aligned generally parallel with the trailer and facing away from the trailer. The operations may further include at the final position, determining an adjustment height being a height that the vehicle has to be raised for a hitch coupler of the trailer to receive a tow vehicle hitch ball. The operations may also include sending a suspension system of the vehicle, a command to adjust a vehicle suspension based on the adjustment height. In some examples, the computing device includes a controller and a deep neural network in communication with the controller.

Yet another aspect of the disclosure provides a method of maneuvering a vehicle in reverse for attachment to a trailer. The method includes detecting, at a neural network of the vehicle, one or more trailers within one or more images. The method also includes receiving, at a user interface in communication with the neural network, an indication of a selected trailer from the one or more detected trailers. The method also includes determining, at a computing device in communication with the neural network, a vehicle path from an initial position to a final position adjacent the trailer. The vehicle path includes maneuvers configured to move the vehicle along the vehicle path from the initial position to the final position. The method also includes autonomously following, at a drive system in communication with the computing device, the vehicle path from the initial position. The method also includes stopping or halting, at the drive system, the vehicle at an intermediate position before reaching the final position, the intermediate position being closer to the final position than the initial position. The method also includes modifying, at the drive system, one or more vehicle suspensions associated with the vehicle to align a vehicle hitch with a trailer hitch. The method also includes autonomously following, at the drive system, the vehicle path from the intermediate position to the final position. The method also includes connecting, at the drive system, the vehicle hitch with the trailer hitch.

Implementations of this aspect of the disclosure may include one or more of the following optional features. In some implementations, the maneuvers include, steering, braking, and speeding. The method may further include continuously detecting, by the neural network, one or more objects within the vehicle path, as the vehicle is moving along the vehicle path. The method may also include when detecting an object, altering the vehicle path at the computing device. In some examples, connecting the vehicle hitch with the trailer hitch includes modifying one or more vehicle suspensions associated with the vehicle allowing the trailer hitch (e.g., a trailer hitch coupler) to receive the vehicle hitch (e.g., tow vehicle hitch ball 162). Detecting one or more trailers may include capturing, at one or more imaging devices in communication with the neural network, one or more images, at least one of the one or more imaging devices positioned on a back side of the trailer facing a rearward direction. The method may also include determining, by the neural network, the one or more trailers within the at least one image.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a schematic view of an exemplary tow vehicle having a user interface displaying an indication of trailers behind the tow vehicle.

FIG. 6 is a flow diagram of an exemplary arrangement of operations for maneuvering a tow vehicle in reverse for attachment to a trailer.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable of autonomously maneuvering towards a trailer and attaching to the trailer, thus eliminating the need for a driver to drive the tow vehicle in a rearward direction while another one or more people provide the driver with directions regarding the path that the tow vehicle has to take to align with the trailer and ultimately a hitch of the trailer. As such, a tow vehicle with an autonomous rearward driving and hitching feature provides a driver with a safer and faster experience when hitching the tow vehicle to the trailer.

Figure 2A:
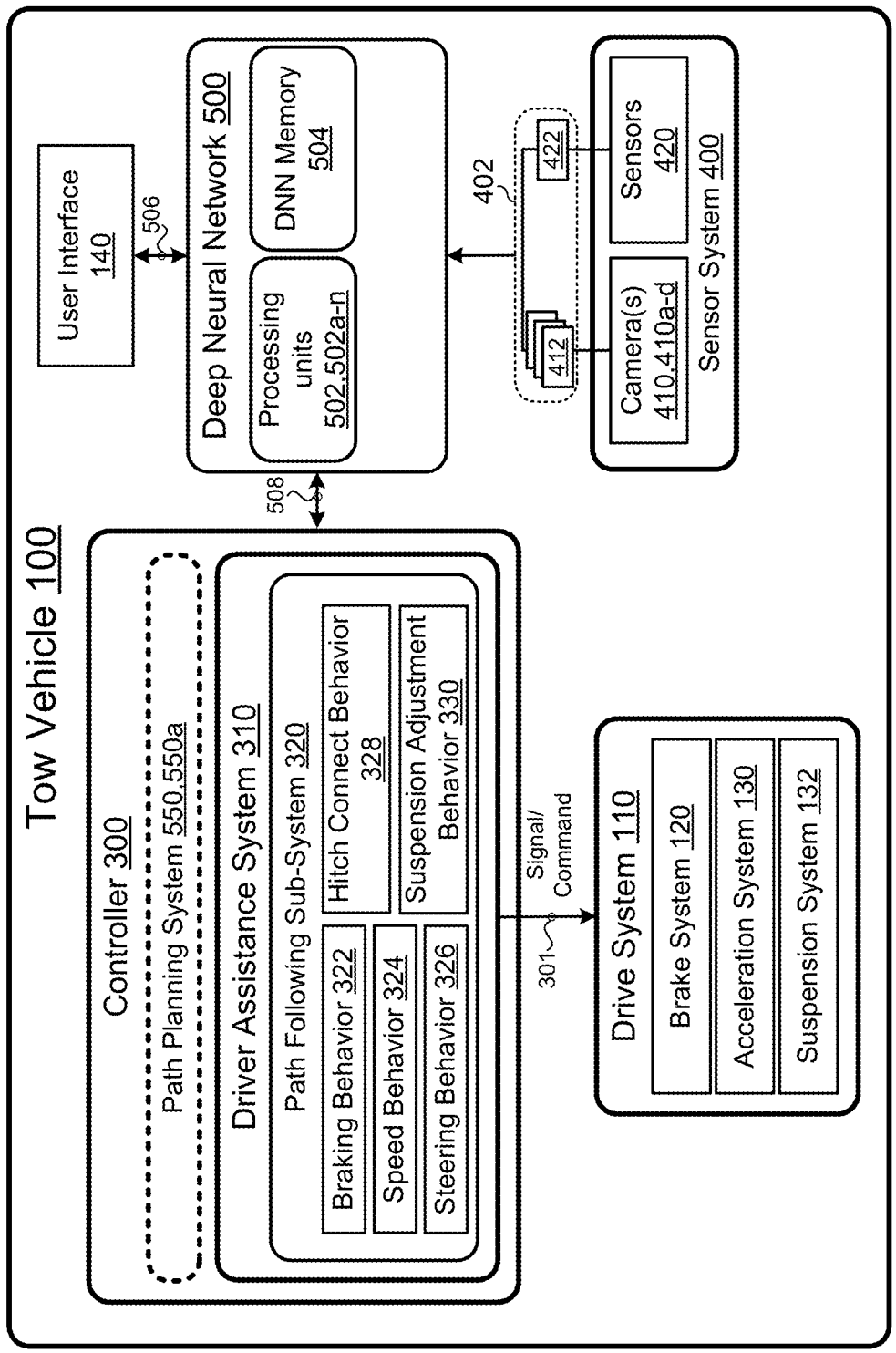
FIGS. 2A and 2B are perspective views of an exemplary tow vehicle.
Figure 2B:
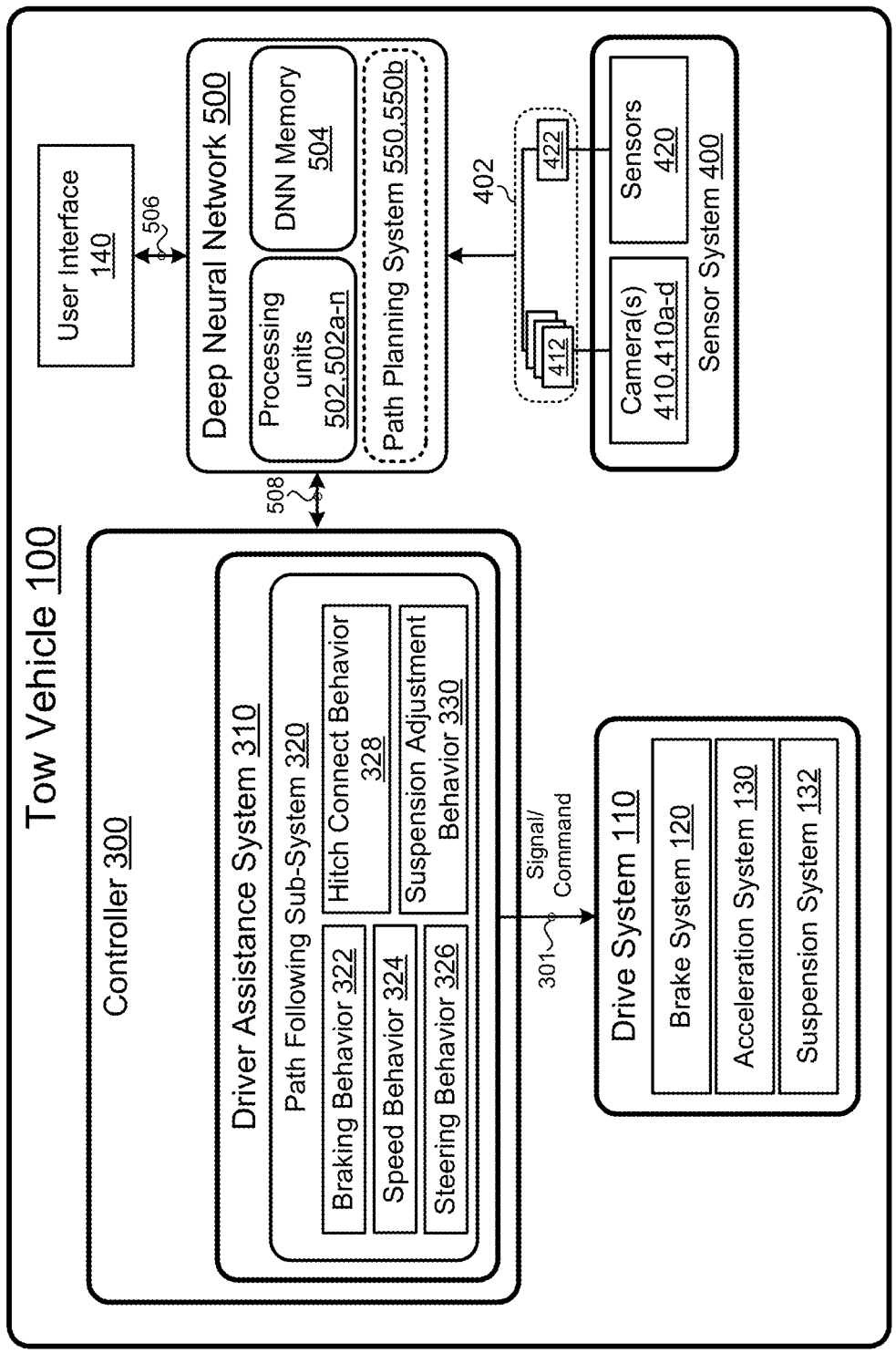

Referring to FIGS. 1-2B, in some implementations, a driver of a tow vehicle 100 wants to tow a trailer 200, 200a-c, for example, a specific trailer 200a-c from a group of trailers 200, 200a-c. As shown, the group of trailers 200, 200a-c includes three trailers, however, the group of trailers 200, 200a-c may include any number of trailers greater than one. The tow vehicle 100 may be configured to receive an indication of a driver selection 144 associated with a selected trailer 200, 200a-c and autonomously drive towards the selected trailer 200, 200a-c. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 120 that includes brakes associated with each wheel 112, 112a-d, and an acceleration system 130 that is configured to adjust a speed and direction of the tow vehicle 100. In addition, the drive system 110 may include a suspension system 132 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 132 improves the road handling of the tow vehicle 100 and provides a better ride quality by isolating road noise, bumps, and vibrations. In addition, the suspension system 132 is configured to adjust a height of the tow vehicle 100 allowing a tow vehicle hitch 160 (e.g., a tow vehicle hitch ball 162) to align with a trailer hitch 210 (e.g., trailer hitch coupler 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x, extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 132 adjusts the suspension of the tow vehicle 100, the tow vehicle 100 may tilt about the X axis and or Y axis, or move along the central vertical axis Z.

The tow vehicle 100 may include a user interface 140, such as, a display. The user interface 140 receives one or more user commands from the driver via one or more input mechanisms or a touch screen display 142 and/or displays one or more notifications to the driver. The user interface 140 is in communication with a vehicle controller 300, which is in turn in communication with a sensor system 400. In some examples, the user interface 140 displays an image of an environment of the tow vehicle 100 leading to one or more commands being received by the user interface 140 (from the driver) that initiate execution of one or more behaviors. The vehicle controller 300 includes a computing device (or processor) 302 (e.g., central processing unit having one or more computing processors) in communication with non-transitory memory 304 (e.g., a hard disk, flash memory, random-access memory) capable of storing instructions executable on the computing processor(s) 302.

The vehicle controller 300 executes a driver assistance system 310, which in turn includes a path following sub-system 320. The path following sub-system 320 receives a planned path 552 (FIGS. 3A and 3B) from a path planning system 550 and executes behaviors 322-330 that send commands 301 to the drive system 110, causing the tow vehicle 100 to autonomously drive about the planned path 552 in a rearward direction R.

Figure 5A:
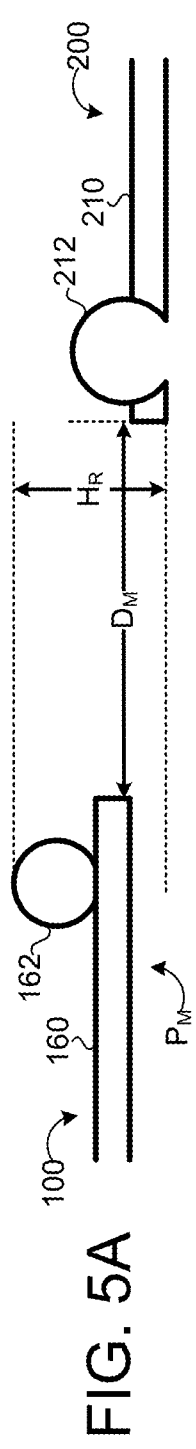
FIGS. 5A-5D are perspective views of an exemplary vehicle hitch connecting to a trailer hitch.
Figure 5B:
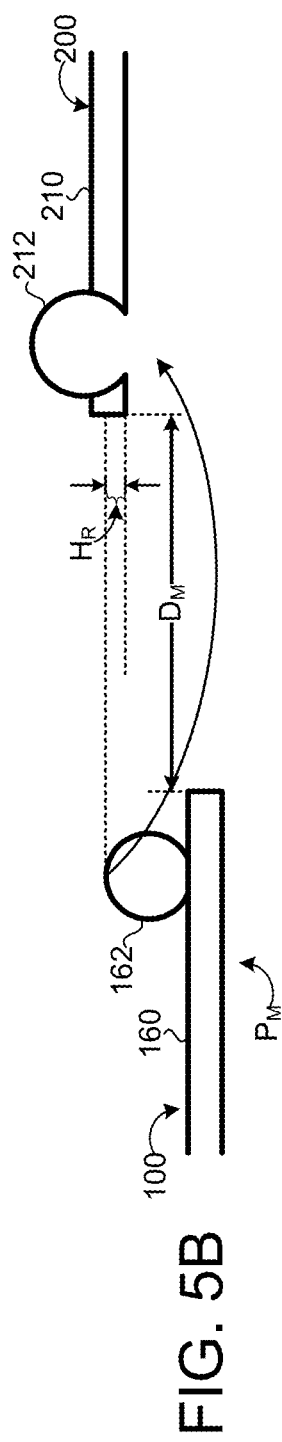
Figure 5C:
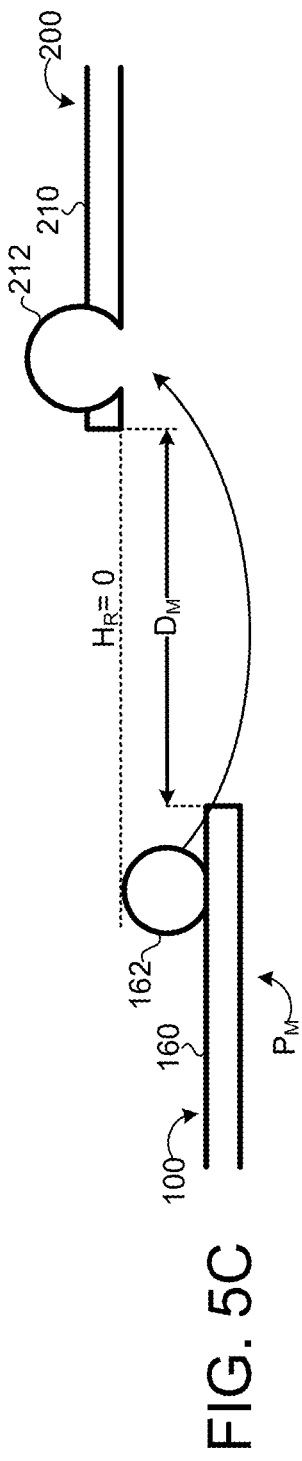

The path following sub-system 320 includes, a braking behavior 322, a speed behavior 324, a steering behavior 326, a hitch connect behavior 328, and a suspension adjustment behavior 330. Each behavior 322-330 causes the tow vehicle 100 to take an action, such as driving backward, turning at a specific angle, breaking, speeding, slowing down, among others. The vehicle controller 300 may maneuver the tow vehicle 100 in any direction across the road surface by controlling the drive system 110, more specifically by issuing commands 301 to the drive system 110. For example, the vehicle controller 300 may maneuver the tow vehicle 100 from an initial position (as shown in FIG. 5A) to a final position (as shown in FIG. 5C). In the final position, a hitch ball 162 of the tow vehicle 100 aligns with a hitch coupler 212 of the trailer 200 connecting the tow vehicle 100 and the selected trailer 200, 200a-c.

The tow vehicle 100 may include a sensor system 400 to provide reliable and robust autonomous driving. The sensor system 400 may include different types of sensors that may be used separately or with one another to create a perception of the environment of the tow vehicle 100 that is used for the tow vehicle 100 to autonomously drive and make intelligent decisions based on objects and obstacles detected by the sensor system 400. The sensors may include, but are not limited to, one or more imaging devices (such as cameras) 410, and sensors 420 such as, but not limited to, radar, sonar, LIDAR (Light Detection and Ranging, which can entail optical remote sensing that measures properties of scattered light to find range and/or other information of a distant target), LADAR (Laser Detection and Ranging), etc. In addition, the camera(s) 410 and the sensor(s) 420 may be used to alert the driver of possible obstacles when the tow vehicle 100 is traveling in the forward direction F or in the rearward direction R, by way of audible alerts and/or visual alerts via the user interface 140. Therefore, the sensor system 400 is especially useful for increasing safety in tow vehicles 100 which operate under semi-autonomous or autonomous conditions.

In some implementations, the tow vehicle 100 includes a rear camera 410, 410a that is mounted to provide a view of a rear driving path for the tow vehicle 100. Additionally, in some examples, the tow vehicle 100 includes a front camera 410, 410b to provide a view of a front driving path for the tow vehicle 100, a right camera 410, 410c positioned on the right side of the tow vehicle 100, and a left camera 410, 410d positioned on the left side of the tow vehicle 100. The left and right cameras 410, 410c, 410d provide additional side views of the tow vehicle 100. In this case, the tow vehicle 100 may detect object and obstacles positioned on either side of the tow vehicle 100, in addition to the objects and obstacle detected along the front and rear driving paths. The camera(s) 410, 410a-d may be a monocular camera, binocular camera, or another type of sensing device capable of providing a view of the rear travelling path of the tow vehicle 100.

In some implementations, the tow vehicle 100 includes one or more Neural Networks (NN) 500, for example, Deep Neural Networks (DNN) to improve the autonomous driving of the tow vehicle 100. DNNs 500 are computational approaches used in computer science, among other disciplines, and are based on a large collection of neural unites, loosely imitating the way a biological brain solves problems with large clusters of biological neurons connected by axons. DNNs 500 are self-learning and trained, rather than programed, and excel in areas where the solution feature detection is difficult to express in a traditional computer program. In other words, DNNs 500 are a set of algorithms that are designed to recognize patterns. DNNs 500 interpret sensor system data 402 (e.g., from the sensor system 400) through a machine perception, labeling or clustering raw input. The recognized patters are numerical, vectors, into which all-real-world data, such as images, text, sound, or time series is translates. The DNN 500 includes multiple layers of nonlinear processing units 502 in communication with DNN non-transitory memory 504. The DNN non-transitory memory 504 stores instructions that when executed on the nonlinear processing units 502 cause the DNN 500 to provide an output 506, 508. Each nonlinear processing unit 502 is configured to transform an input or signal (e.g., sensor system data 402) using parameters that are learned through training. A series of transformations from input (e.g., sensor system data 402) to outputs 506, 508 occurs at the multiple layers of the nonlinear processing units 502. Therefore, the DNN 500 is capable of determining the position of the trailer hitch 210 associated with a selected trailer 200, 200a-c based on images 412 or sensor data 422 of the rearward path 552 between the tow vehicle 100 and the trailer 200 based on the location of the selected trailer 200, thus eliminating the need of using a DGPS or a GPS.

The DNN 500 receives sensor system data 402 (including images 412 and/or sensor data 422) and based on the received data 402 provides an image output 506 to the user interface 140 and/or a data output 508 to the vehicle controller 300. In some examples, the DNN 500 receives image(s) 412 of a rear view of the tow vehicle 100 from the camera 410 in communication with the DNN 500. The DNN 500 analyzes the image 412 and identifies one or more trailers 200 in the received image 412. The DNN 500 may also receive sensor data 422 from the sensors 420 in communication with the DNN 500, and analyze the received sensor data 422. Based on the analyzed images 412 (or the analyzed images 412 and the sensor data 422), the DNN 500 identifies the location of each identified trailer 200 relative to the tow vehicle 100, for example by way of a coordinate system. As such, the DNN 500 displays on the user interface 140 the received images 412 displaying representations 146, 146a-c of the identified trailers 200, 200a-c located at a distance behind the tow vehicle 100. As shown in FIG. 1, first, second, and third trailers 200a, 200b, 200c are positioned behind the tow vehicle 100. As such, the user interface 140 displays first, second, and third trailer representations 146a, 146b, 146c associated with the first, second, and third trailers 200a, 200b, 200c respectively.

The driver may select one of the trailer representations 146, 146a-c indicating that the driver wants the tow vehicle 100 to autonomously drive and connect to the trailer 200, 200a-c associated with the selected trailer representation 146, i.e., the driver selection 144. In some examples, the user interface is a touch screen display 142; as such, the driver may point his finger and select the trailer representation 146. In other examples, the user interface 140 is not a touchscreen and the driver may use an input device, such as, but not limited to, a rotary knob or a mouse to select one of the trailer representations 146, 146a-c.

When the driver selects which trailer 200, 200a-c he/she wants the tow vehicle 100 to connect to, a path planning system 550 plans a path 552 (FIGS. 3A and 3B) between the tow vehicle 100 and the trailer 200 based on the location of the selected trailer 200, 200a-c (determined by the DNN 500 from the received sensor system data 402) relative to a position of the tow vehicle 100 (e.g., orientation and distance). As the tow vehicle 100 is autonomously backing up towards the selected trailer 200 (the first trailer 200a as shown in FIG. 1). The planned path 552 allows the tow vehicle 100 to autonomously drive and connect to the trailer 200. The path planning system 550 plans the path 552 for the tow vehicle 100 to autonomously maneuver such that the tow vehicle 100, in an intermediate position within a predetermined distance D from the trailer 200, is in an orientation aligned generally parallel with the trailer 200 and facing away from the trailer 200, where the hitch 160 of the tow vehicle 100 is substantially aligned with the hitch 210 of the trailer 200.

Figure 3A:
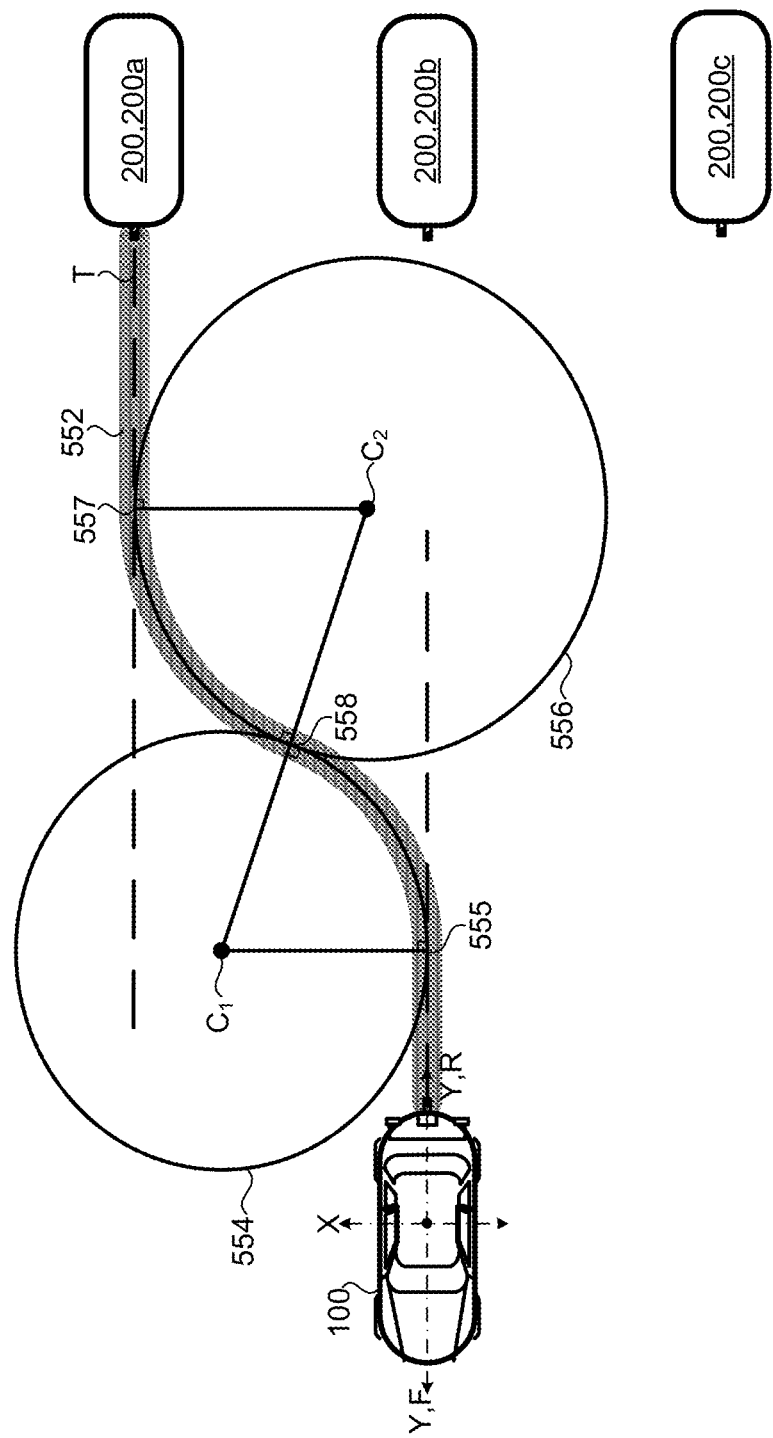
FIGS. 3A and 3B are perspective views of an exemplary tow vehicle autonomously maneuvering along a planned path.
Figure 3B:
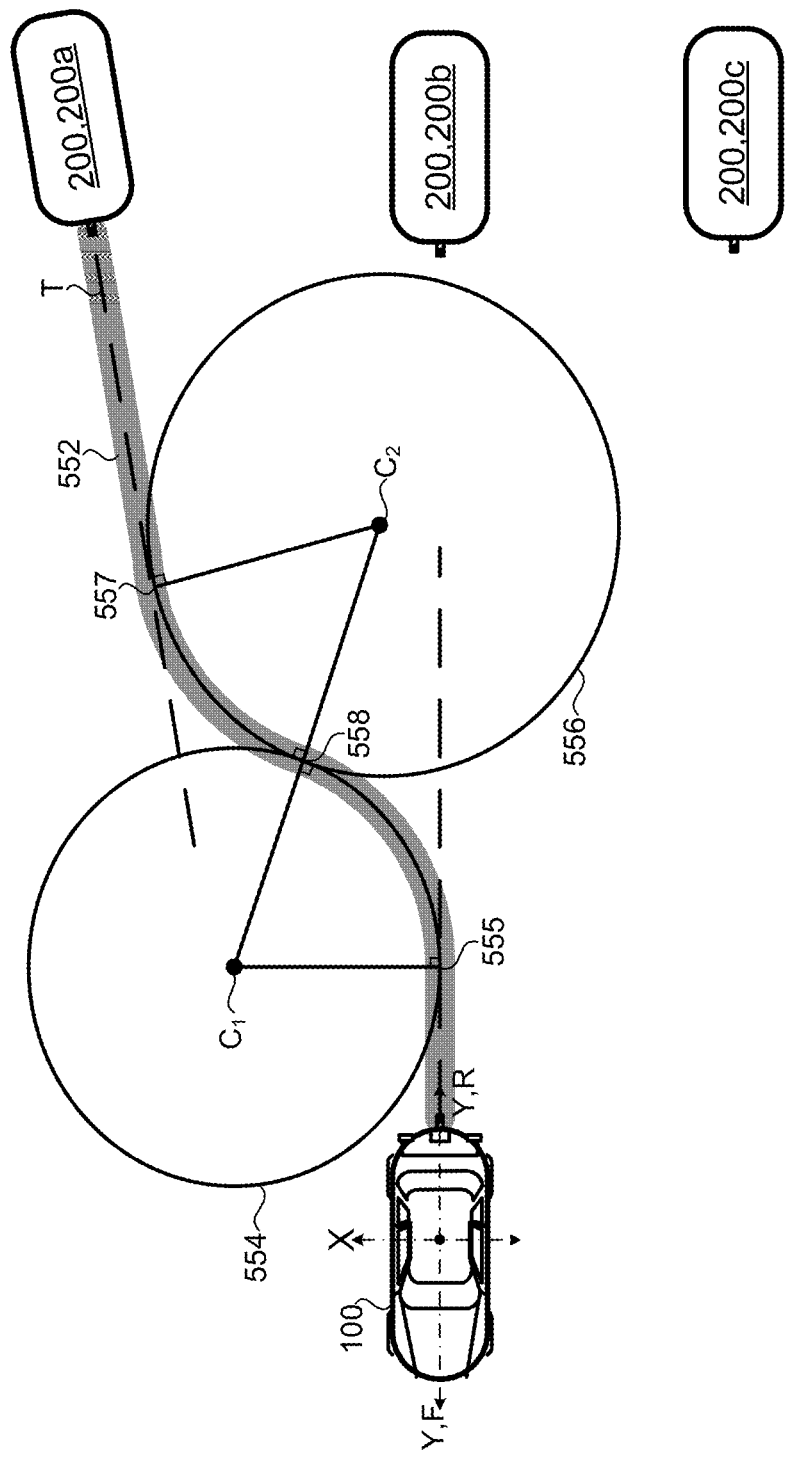

In some examples, the path planning system 550 is part of the vehicle controller 300 as shown in FIG. 2A; while in other examples, the path planning system 550 is part of the DNN 500 as shown in FIG. 2B. Referring to FIG. 2A, when the driver selects the trailer representation 146a associated with the trailer 200a (e.g., the first trailer 200a) that the driver wants the tow vehicle 100 to autonomously drive towards and connect with, the DNN 500a sends the controller 300 data output 508 including the selected trailer 200a and the location of the selected trailer 200a with respect to the tow vehicle 100. In this case, the path planning system 550a plans the path 552 between the tow vehicle 100 and the selected trailer 200a. The path planning system 550a may use several methods to determine the path 552. FIGS. 3A and 3B provide a method for path planning. In some examples, the path planning system 550a extends its fore-aft axis Y in the rearward direction R while the trailer 200a extends a fore-aft axis about the length of the trailer 200 in a forward direction. The path planning system 550a draws a first circle 554 tangent at a first tangent point 555 to the tow vehicle fore-aft axis Y facing the trailer fore-aft axis, and a second circle 556 tangent at a second tangent point 557 to the trailer fore-aft axis facing the tow vehicle fore-aft axis Y. The first and second circles 554, 556 intersect at an intersection point 558. The size of the first and second circles 554, 556 may be adjusted and manipulated based on the distance between the tow vehicle 100 and the trailer 200, obstacles and object positioned between the tow vehicle 100 and the trailer 200, and any other considerations. The path planning system 550a determines the path 552 by following the tow vehicle fore-aft axis Y until the first tangent point 555, then moving along an arc of the first circle 554 until the intersection point 558, then moving along an arc of the second circle 556 until the second tangent point 557, then following the trailer fore-aft axis. As such, the planned path 552 positions the tow vehicle 100 in an orientation aligned generally parallel with the trailer 200 and facing away from the trailer 200a, where the hitch 160 of the tow vehicle 100 is substantially aligned with the hitch 210 of the trailer 200. In other words, where the fore-aft axis Y of the tow vehicle 100 is substantially aligned with the fore-aft axis T of the trailer 200a. FIG. 3A shows an example of the path 552 where the fore-aft axis Y of the tow vehicle 100 is substantially parallel to the fore-aft axis T of the trailer 200a. While FIG. 3B shows an example of the path 552 where the fore-aft axis Y of the tow vehicle 100 is not substantially parallel to the fore-aft axis T of the trailer 200a. However, the planned path 552 of FIG. 3B is determined similar to the planned path 552 of FIG. 3A.

With continued reference to FIGS. 2A, 3A and 3B, in some examples, when the tow vehicle 100 is autonomously driving along the planned path 552, the DNN 500 continuously sends the vehicle controller 300 the location of the selected trailer 200a with respect to the tow vehicle 100 as the tow vehicle 100 moves along the planned path 552, based on the received sensor system data 402, i.e., images 412. Since the images 412 are updated as the tow vehicle 100 approaches the selected trailer 200a, then the location of the selected trailer 200a with respect to the tow vehicle 100 also changes as the tow vehicle 100 moves closer to the selected trailer 200a. In some examples, the DNN 500 identifies one or more objects along the planned path 552 and sends the path planning system 550a data relating to the position of the one or more objects. In this case, the path planning system 550a may recalculate the planned path 552 to avoid the one or more objects. In some examples, the path planning system 550a determines a probability of collision and if the probability of collision exceeds a predetermined threshold, the path planning system 550a adjusts the planned path 552 and sends an adjusted planned path 552 to the path following sub-system 320.

Referring back to FIG. 2B, in some implementations the DNN 500 includes the path planning system 550b. As such, the path planning system 550b may determine a path 552 based on learned behaviors. For example, the DNN 500 determines the position of the selected trailer 200a, and based on the position determines a path 552 for the tow vehicle 100. In some examples, the determined path 552 may be similar to the path described with respect to FIGS. 3A and 3B. However, other path determination methods may also be possible. Similarly, the DNN 500, i.e., the path planning system 550b of the DNN 500 adjusts the planned path 552 based on one or more objects (moving or stationary) that may be identified along the planned path 552 as the tow vehicle 100 is moving about the path 552. In some examples, the path planning system 550b determines a probability of collision and if the probability of collision exceeds a predetermined threshold, the path planning system 550b adjust the path and sends an adjusted path 552 to the path following sub-system 320.

Referring back to FIGS. 2A and 2B, once the path planning system 550 plans a path 552, the path following sub-system 320 is configured to execute behaviors that cause the drive system 110 to autonomously follow the planned path 552. Therefore, the path following sub-system 320 includes one or more behaviors 322-330 that once executed allow for the autonomous driving of the tow vehicle 100 along the planned path 552. The behaviors 322-330 may include, but are not limited to a braking behavior 322, a speed behavior 324, a steering behavior 326, a hitch connect behavior 328, and a suspension adjustment behavior 330.

The braking behavior 322 may be executed to either stop the tow vehicle 100 or to slow down the tow vehicle 100 based on the planned path 552. The braking behavior 322 sends a signal or command 301 to the drive system 110, e.g., the brake system 120, to either stop the tow vehicle 100 or reduce the speed of the tow vehicle 100.

The speed behavior 324 may be executed to change the speed of the tow vehicle 100 by either accelerating or decelerating based on the planned path 552. The speed behavior 324 sends a signal or command 301 to the brake system 120 for decelerating or the acceleration system 130 for accelerating.

The steering behavior 326 may be executed to change the direction of the tow vehicle 100 based on the planned path. As such, the steering behavior 326 sends the acceleration system 130 a signal or command 301 indicative of an angle of steering causing the drive system 110 to change direction.

Figure 4A:
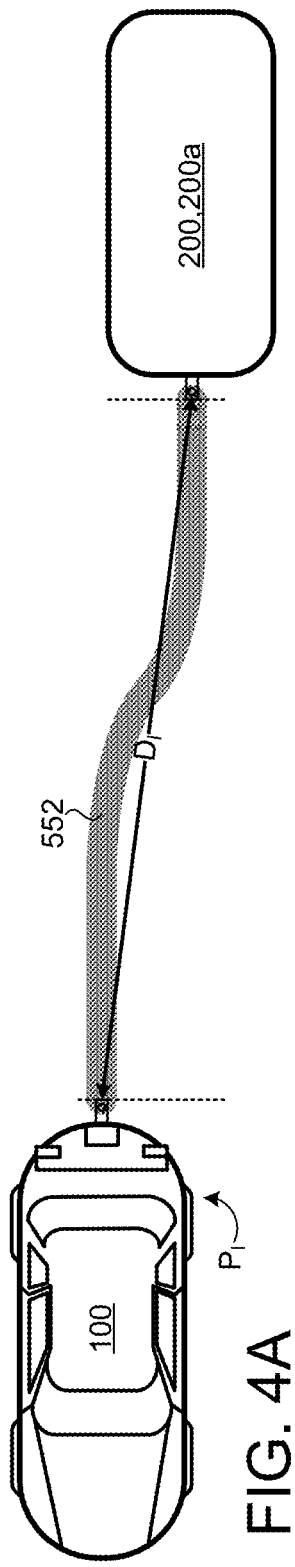
FIG. 4A is a perspective view of an exemplary tow vehicle at an initial position.
Figure 4B:
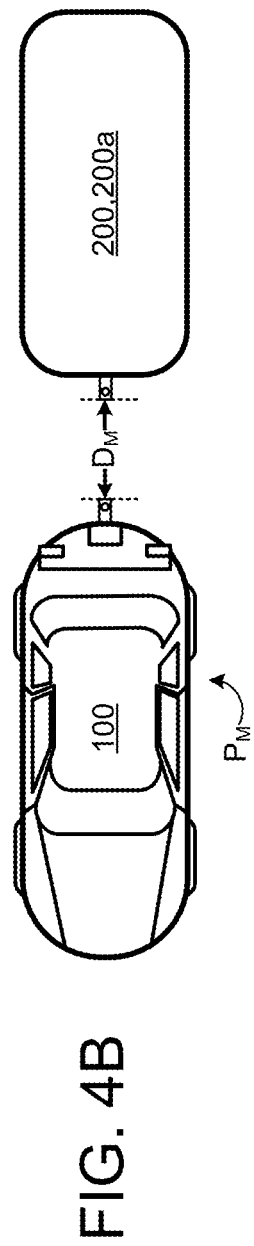
FIG. 4B is a perspective view of an exemplary tow vehicle at an intermediate position.
Figure 4C:
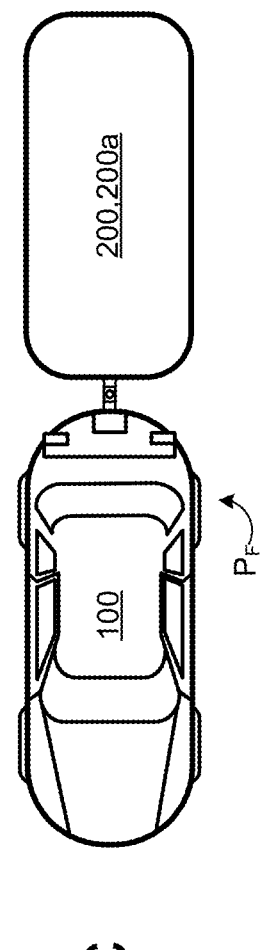
FIG. 4C is a perspective view of an exemplary tow vehicle at a final position.

FIGS. 4A-4C show the tow vehicle 100 at an initial position $P_I$ (FIG. 4A), an intermediate position $P_M$ (FIG. 4B), and a final position $P_F$ (FIG. 4C) or a connected position, with respect to the selected trailer 200a. Referring to FIG. 4A, the tow vehicle 100 is at the initial position $P_I$ relative to the trailer 200 prior to initiating autonomous maneuvering towards the selected trailer 200a. In some examples, an initial distance $D_I$ between the tow vehicle 100 and the selected trailer 200a is about 15 meters. The tow vehicle 100 autonomously maneuvers along the planned path 552 until the tow vehicle 100 reaches an intermediate position $P_M$ being an intermediate distance $D_M$ from the selected trailer 200a, as shown in FIG. 4B. In the intermediate position $P_M$, the tow vehicle hitch 160 is in an orientation aligned generally parallel with the selected trailer 200a and the tow vehicle hitch 160 is substantially aligned with the trailer hitch 210 of the trailer 200a. In other words, the vehicle fore-aft Y defines a plane that extends along the vehicle vertical axis Z and which in turn is aligned with the trailer fore-aft T extending along a trailer vertical axis. In some examples, the intermediate distance $D_M$ is about 1 meter from the selected trailer 200a.

Figure 5D:
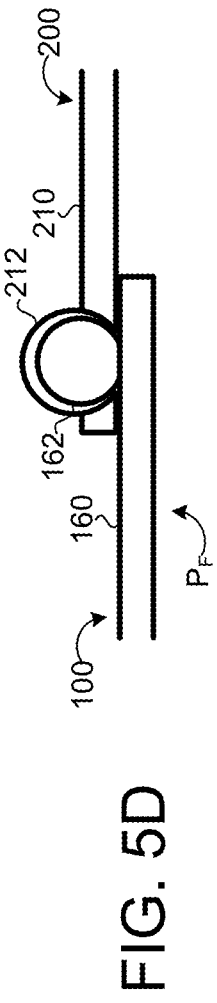

Referring to FIGS. 5A-5D, in some examples, when the tow vehicle 100 is in the intermediate position $P_M$ the hitch connect behavior 328 executes to connect the vehicle hitch 160 with the trailer hitch 210. The DNN 500 determines a relative height $H_R$ between a top portion of the tow vehicle hitch ball 162 and a bottom portion of the trailer hitch coupler 212. To connect the tow vehicle 100 and the selected trailer 200a, the trailer hitch coupler 212 releasably receives the tow vehicle hitch ball 162. Therefore, to connect the tow vehicle hitch ball 162 to the trailer hitch coupler 212, the relative height $H_R$ has to equal zero or less than zero allowing the tow vehicle hitch ball 162 to move under and be inserted in the trailer hitch coupler 212. Therefore, when the hitch connect behavior 328 receives, from the DNN 500, a relative height $H_R$ between the tow vehicle hitch ball 162 and the trailer hitch coupler 212 being greater than zero, then the hitch connect behavior 328 sends a command to the suspension adjustment behavior 330 to execute and issue a command 301 to the suspension system 132 to adjust the height of the tow vehicle 100 reducing the relative height $H_R$ based on the measurements from the DNN 500. When the hitch connect behavior 328 receives a relative height $H_R$ that is equal to or less than zero, then the hitch connect behavior 328 issues a command 301 to the drive system 110 to maneuver along the remainder of the path 552, i.e., from the intermediate position $P_M$ to the final position $P_F$ (FIG. 4C), connecting the tow vehicle 100 to the selected trailer 200a. Once the trailer 200 reaches the final position $P_F$, the suspension adjustment behavior 330 issues a command 301 to the suspension system 132 to adjust the height of the tow vehicle 100 resulting in the trailer hitch coupler 212 receiving the tow vehicle hitch ball 162 as shown in FIG. 5D.

FIG. 6 illustrates an example arrangement of operations for a method 600 of autonomously maneuvering a tow vehicle 100 (as shown in FIGS. 1-5D) towards a selected trailer 200, 200a. At block 602, the method 600 includes receiving an indication that a driver wants to autonomously hitch the tow vehicle 100 to a trailer 200, 200a-c. The indication may be by way of a selection on the user interface 140 of the tow vehicle 100, putting the tow vehicle in reverse (without reversing), or any other indication. At block 604, the DNN 500 detects and locates one or more trailers 200, 200a-c behind the tow vehicle 100 and displays on the user interface 140 trailer representations 146, 146a-c associated with the one or more identified trailers 200, 200a-c respectively. At decision block 606, the method 600 waits for a driver selection 144 from the one or more trailer representations 146, 146a-c. When the driver selects a trailer representation 146, 146a-c associated with a selected trailer 200a, at block 608, the method 600 includes planning a path 552 from an initial position $P_I$ of the tow vehicle 100 to a final position $P_F$ with respect to the selected trailer 200a. In some examples, the path planning system 550, 550a, 550b plans the path 552. The path planning system 550, 550a, 550b may be part of the controller 300 (FIG. 2A) or part of the DNN 500 (FIG. 2B). At block 610, the method 600 includes executing the path following sub-system 320. At decision block 612, the method 600 determines if the tow vehicle 100 is within a predetermined distance from the selected trailer 200a, i.e., the method 600 determines if the tow vehicle 100 has reached the intermediate position $P_M$. When the tow vehicle 100 reaches the intermediate position $P_M$, the method 600 at decision block 612 includes determining a relative height $H_R$ between a top portion of the hitch ball 162 of the tow vehicle 100 and a bottom portion of the hitch coupler 212 of the selected trailer 200a and determines if the hitch coupler 212 can releasably receive the hitch ball 162 based on the relative height $H_R$. In other words, the method 600 includes determining if the relative height $H_R$ equals to zero. If the relative height $H_R$ is not equal to zero, then at block 616, the method 600 includes adjusting the suspension of the tow vehicle 100 and then determining the relative height $H_R$ and checking if the relative height $H_R$ equals to or less than zero at block 614. Once the relative height $H_R$ is equal to or is less than zero, then the method 600 at block 618 includes continuing maneuvering about the path 552 from the intermediate position $P_M$ to the final position $P_F$ connecting the hitch ball 162 of the tow vehicle 100 with the hitch coupler 212 of the selected trailer 200a. Once the trailer 200 reaches the final position $P_F$, the method 600 includes adjusting the height of the tow vehicle 100 resulting in the trailer hitch coupler 212 receiving the tow vehicle hitch ball 162 as shown in FIG. 5D.

Figure 7:
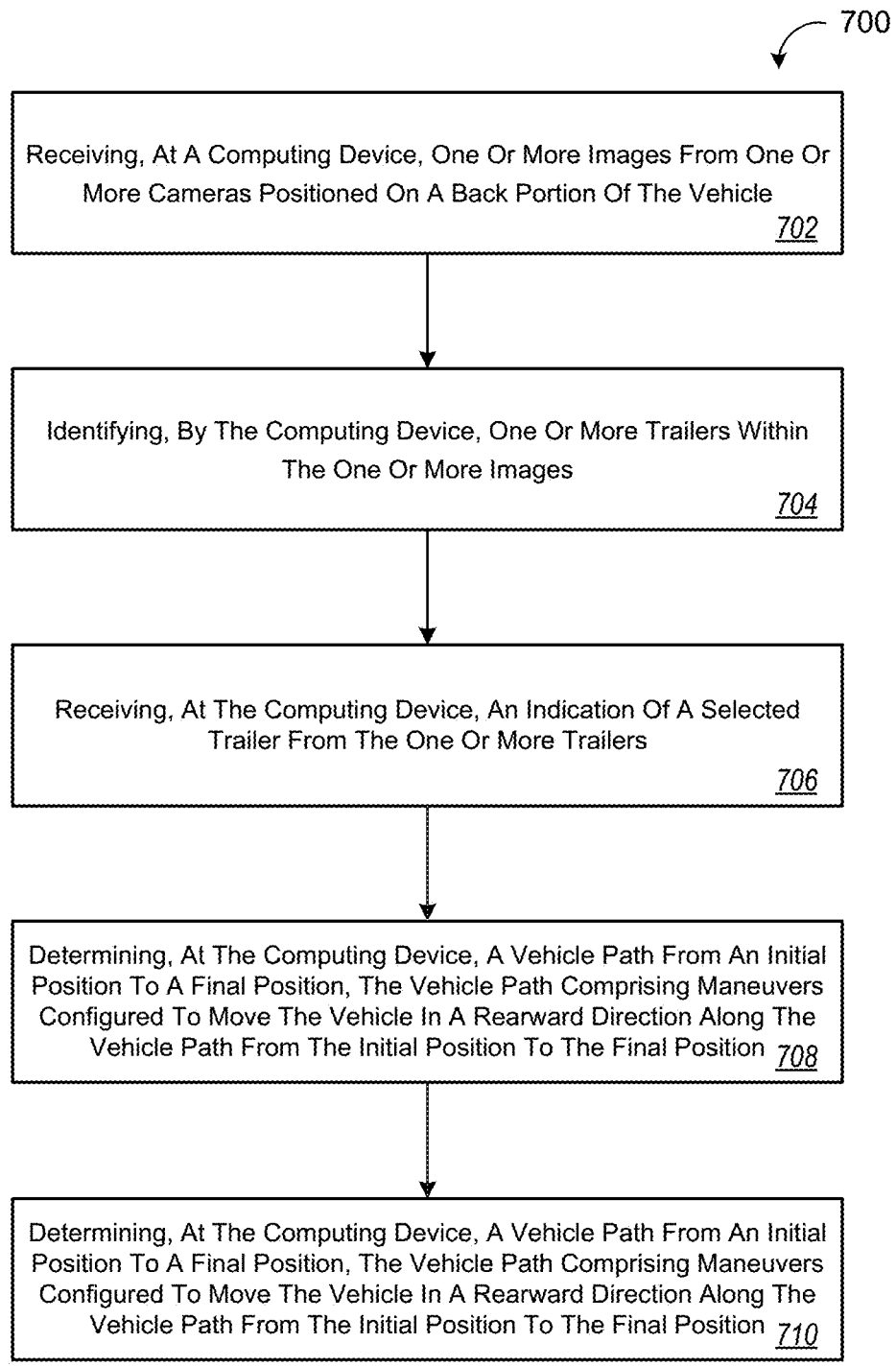
FIGS. 7 and 8 are schematic views of exemplary arrangements of operations for maneuvering a tow vehicle in reverse for attachment to a trailer.

FIG. 7 is a schematic view of an exemplary arrangement of operations for a method 700 of maneuvering a tow vehicle 100 in reverse for attachment to a trailer 200, 200a-c according to the description of FIGS. 1-5D. At block 702, the method 700 includes receiving, at a computing device (e.g., a controller 300 and a deep neural network 500 in communication with the controller 300), one or more images 412 from one or more cameras 410, 410a-d positioned on a back portion of the vehicle 100. The image(s) 412 capture a rearward view of the vehicle 100. Therefore, the image(s) 412 may include one or more trailer 200, 200a-c positioned behind the vehicle 100. At block 704, the method 700 includes identifying, by the computing device, one or more trailers 200, 200a-c within the one or more images 412. At block 706, the method 700 includes receiving, at the computing device, an indication of a selected trailer 200, 200a-c from the one or more trailers 200, 200a-c. In some examples, the computing device is in communication with a user interface 140 (e.g., a display) configured to receive the driver selection 144 of the selected trailer 200, 200a-c. In some examples, the user interface 140 is positioned in the vehicle 100; however, the user interface 140 may be, but not limited to, a handheld table, a smart phone, or a computer, positioned inside or outside the vehicle. At block 708, the method 700 includes determining, at the computing device (e.g., path planning system 550, 550a, 550b), a vehicle path 552 from an initial position $P_I$ to a final position $P_F$. The vehicle path 552 includes maneuvers configured to move the vehicle 100 in a rearward direction R along the vehicle path 552 from the initial position $P_I$ to the final position $P_F$. At block 710, the method 700 includes executing, by the computing device, one or more behaviors 322-330 causing the vehicle 100 to take an action to autonomously follow the vehicle path 552 and execute the maneuvers.

In some implementations, the one or more behaviors 322-330 include a braking behavior 322, a speed behavior 324, a steering behavior 326, a hitch connect behavior 328, and a suspension adjustment behavior 330.

In some examples, the method 700 includes receiving, at the computing device, one or more sensor system data 402 from a sensor system 400 in communication with the computing device. The sensor system data 402 may include images 412 from one or more cameras 410a, 410a-d, and/or sensor data from one or more sensors 420. The method 700 may include detecting, by the computing device, one or more objects along or adjacent to the vehicle path 552 from the sensor system data 402. The method 700 includes adjusting, by the computing device (e.g., path planning system 550, 550a, 550b), the vehicle path 552 based on the one or more objects detected from the sensor system data 402. The vehicle path 552 may include the initial position $P_I$, an intermediate position $P_M$, and the final position $P_F$. The intermediate position $P_M$ has a distance $D_M$ to the final position $P_F$ being less than a distance between the intermediate position and the initial position $P_I$. In other words, the distance $D_I$ between the initial position $P_I$ and the final position $P_F$ is greater than the distance $D_M$ between the intermediate position $P_M$ and the final position $P_F$. In some examples, at the intermediate position $P_M$, the trailer 200, 200a-c is in an orientation aligned generally parallel with the trailer 200, 200a-c and facing away from the trailer 200, 200a-c.

In some implementations, the method 700 includes at the final position $P_F$, determining, by the computing device an adjustment height. The adjustment height being a height that the vehicle 100 has to be raised for a hitch coupler 212 of the trailer 200, 200a-c to receive a tow vehicle 100 hitch ball 162. The method 700 also includes sending, from the computing device to a suspension system 132 of the vehicle 100, a command 301 to adjust a vehicle suspension based on the adjustment height.

Figure 8:
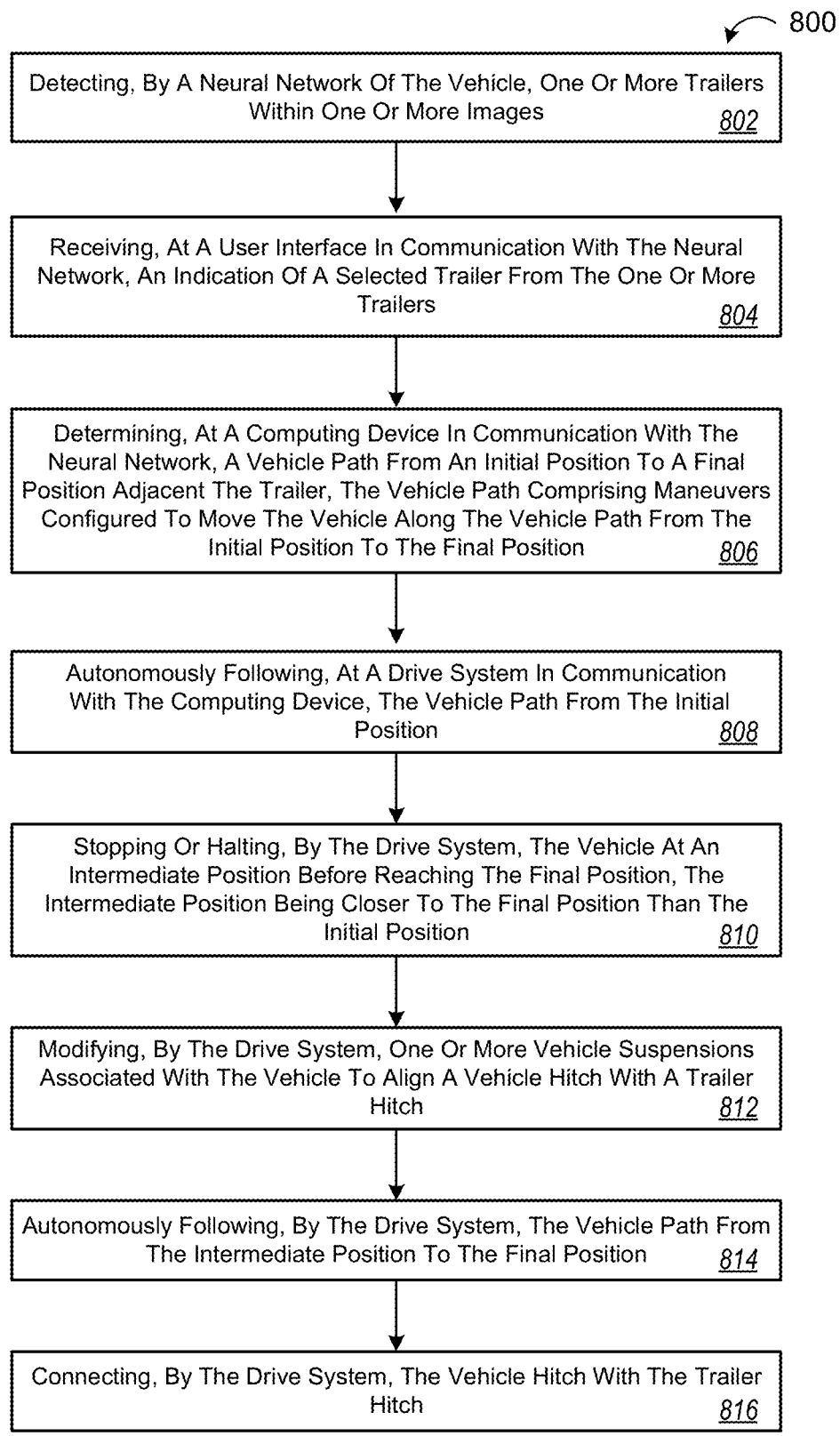

FIG. 8 is a schematic view of another exemplary arrangement of operations for a method 800 of maneuvering a tow vehicle 100 in reverse for attachment to a trailer 200, 200a-c according to the description of FIGS. 1-5D. At block 802, the method 800 includes detecting, at a neural network 500 of the vehicle 100, one or more trailers 200, 200a-c within one or more images 412. The one or more neural network 500 receives the images 412 from one or more cameras 410 positioned on a rear portion of the vehicle 100 to capture images 412 of a view behind the vehicle 100. At block 804, the method 800 includes receiving, at a user interface 140 in communication with the neural network 500, an indication (e.g., driver selection 144) of a selected trailer 200, 200a-c from the one or more detected trailers 200, 200a-c. At block 806, the method 800 also includes determining, at a computing device (e.g., a controller 300 having a path planning system 550a) in communication with the neural network 500, a vehicle path 552 from an initial position $P_I$ to a final position $P_F$ adjacent the trailer 200, 200a-c. Alternatively, in some examples, the method includes determining, at the neural network 500 (e.g., path planning system 550b) the vehicle path 552 from the initial position $P_I$ to the final position $P_F$ adjacent the trailer 200, 200a-c. In yet another example, both the controller 300 and the deep neural network 500 plan the vehicle path 552. The vehicle path 552 includes maneuvers that allow the vehicle 100 to move along the vehicle path 552 from the initial position $P_I$ to the final position $P_F$. At block 808, the method 800 includes autonomously following, at a drive system 110 in communication with the computing device, the vehicle path 552 from the initial position $P_I$. The drive system 110 includes a brake system 120, an acceleration system 130, and a suspension system 132. At block 810, the method 800 includes stopping or halting, at the drive system 110 (e.g., the brake system 120), the vehicle 100 at an intermediate position $P_M$ before reaching the final position $P_F$, the intermediate position $P_M$ being closer to the final position $P_F$ than the initial position $P_I$. At block 812, the method 800 includes modifying, at the drive system 110 (e.g., suspension system 132), one or more vehicle suspensions associated with the vehicle 100 to align a vehicle hitch 160 with a trailer hitch 210. At block 814, the method 800 includes autonomously following, at the drive system 110, the vehicle path 552 from the intermediate position $P_M$ to the final position $P_F$. At block 816, the method 800 includes connecting, at the drive system 110, the vehicle hitch 162 with the trailer hitch 212.

In some implementations, the maneuvers may include, but are not limited to steering left or right at a specific angle, steering straight, braking, and speeding. In some examples, the method 800 further includes continuously detecting, by the neural network 500, one or more objects within the vehicle path 552 as the vehicle 100 is moving rearwards along the vehicle path 552. When the neural network 500 detects an object, the method 800 includes altering the vehicle path 552 at the controller 300 (e.g., path planning system 550a) or the neural network 500 (e.g., path planning system 550b). In some examples, connecting the vehicle hitch 162 with the trailer hitch 212 includes modifying one or more vehicle suspensions associated with the vehicle 100 allowing the trailer hitch 212 (e.g., trailer coupler 212) to receive the vehicle hitch 162 (e.g., tow vehicle hitch ball 162). Detecting one or more trailers 200, 200a-c may include: capturing, at one or more imaging devices 410, 410a-d in communication with the neural network 500, one or more images 412, where at least one of the one or more imaging devices 410, 410a-d positioned on a back side of the trailer 200, 200a-c facing a rearward direction R. The method 800 may also include determining, by the neural network 500, the one or more trailers 200, 200a-c within the at least one image 412.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of maneuvering a vehicle in reverse for attachment to a trailer, the method comprising:
   receiving, at a computing device, one or more images from one or more cameras positioned on a back portion of the vehicle;
   identifying, by the computing device, two or more trailers within the one or more images;
   receiving, at the computing device, an indication of a driver selection associated with a selected trailer from the two or more trailers;
   determining, at the computing device, a vehicle path from an initial position to a final position, the vehicle path comprising maneuvers configured to move the vehicle in a rearward direction along the vehicle path from the initial position to the final position; and
   executing, by the computing device, one or more behaviors causing the vehicle to take an action to autonomously follow the vehicle path and execute the maneuvers.

2. The method of claim 1, wherein the one or more behaviors comprise: a braking behavior, a speed behavior, a steering behavior, a hitch connect behavior, and a suspension adjustment behavior.

3. The method of claim 1, further comprising:
receiving, at the computing device, one or more sensor data from a sensor system supported by the vehicle and in communication with the computing device;
detecting, by the computing device, one or more objects along or adjacent to the vehicle path from the sensor data; and
adjusting, by the computing device, the vehicle path based on the one or more objects.

4. The method of claim 1, wherein the vehicle path includes an intermediate position having a distance to the final position being less than a distance between the intermediate position and the initial position, wherein at the intermediate position, the trailer is in an orientation aligned generally parallel with the trailer and facing away from the trailer.

5. The method of claim 4, further comprising:
at the final position, determining, by the computing device an adjustment height being a height that the vehicle has to be raised for a hitch coupler of the trailer to receive a tow vehicle hitch ball; and
sending, from the computing device to a suspension system of the vehicle, a command to adjust a vehicle suspension based on the adjustment height.

6. The method of claim 4, wherein the computing device includes a controller and a deep neural network in communication with the controller.

7. The method of claim 1, wherein receiving the indication of a driver selection associated with the selected trailer from the two or more trailers includes receiving the indication from a user interface in communication with the computing device.

8. A vehicle for maneuvering in reverse along a path for attachment to a trailer, the vehicle comprising:
one or more cameras positioned on a back portion of the vehicle;
a computing device in communication with a user interface; and
non-transitory memory in communication with the computing device, the non-transitory memory storing instructions that when executed on the computing device cause the computing device to perform operations comprising:
receiving one or more images from the one or more cameras;
identifying two or more trailers within the one or more images;
receiving an indication of a selected trailer from the two or more trailers, the indication indicative of a driver selection by way of the user interface;
determining a vehicle path from an initial position to a final position, the vehicle path comprising maneuvers to move the vehicle in a rearward direction along the vehicle path from the initial position to the final position; and
executing one or more behaviors causing the vehicle to take an action to autonomously follow the vehicle path and execute the maneuvers.

9. The vehicle of claim 8, wherein the one or more behaviors comprise: a braking behavior, a speed behavior, a steering behavior, a hitch connect behavior, and a suspension adjustment behavior.

10. The vehicle of claim 8, wherein the operations further comprise:
receiving one or more sensor data from a sensor system in communication with the computing device;
detecting one or more objects along or adjacent to the vehicle path from the sensor data; and
adjusting the vehicle path based on the one or more objects.

11. The vehicle of claim 8, wherein the vehicle path includes an intermediate position having a distance to the final position being less than a distance between the intermediate position and the initial position, wherein at the intermediate position, the trailer is in an orientation aligned generally parallel with the trailer and facing away from the trailer.

12. The vehicle of claim 11, wherein the operations further include:
at the final position, determining an adjustment height being a height that the vehicle has to be raised for a hitch coupler of the trailer to receive a tow vehicle hitch ball; and
sending a suspension system of the vehicle, a command to adjust a vehicle suspension based on the adjustment height.

13. The vehicle of claim 8, wherein the computing device includes a controller and a deep neural network in communication with the controller.

14. A method of maneuvering a vehicle in reverse for attachment to a trailer, the method comprising:
detecting, by a neural network of the vehicle, two or more trailers within one or more images;
receiving, at a user interface in communication with the neural network, an indication of a selected trailer from the two or more trailers;
determining, at a computing device in communication with the neural network, a vehicle path from an initial position to a final position adjacent the trailer, the vehicle path comprising maneuvers configured to move the vehicle along the vehicle path from the initial position to the final position;
autonomously following, at a drive system in communication with the computing device, the vehicle path from the initial position;
stopping or halting, by the drive system, the vehicle at an intermediate position before reaching the final position, the intermediate position being closer to the final position than the initial position;
modifying, by the drive system, one or more vehicle suspensions associated with the vehicle to align a vehicle hitch with a trailer hitch;
autonomously following, by the drive system, the vehicle path from the intermediate position to the final position; and
connecting, by the drive system, the vehicle hitch with the trailer hitch.

15. The method of claim 14, wherein the maneuvers include, steering, braking, and speeding.

16. The method of claim 14, further comprising:
continuously detecting, at the neural network, one or more objects within the vehicle path as the vehicle is moving along the vehicle path; and
when detecting an object, altering the vehicle path at the computing device.

17. The method of claim 14, wherein connecting the vehicle hitch with the trailer hitch comprises modifying one or more vehicle suspensions associated with the vehicle allowing the trailer hitch to receive the vehicle hitch.

18. The method of claim 14, wherein detecting the two or more trailers comprises:
capturing, at one or more imaging devices in communication with the neural network, one or more images, at least one of the one or more imaging devices positioned on a back side of the trailer facing a rearward direction; and determining, at the neural network, the one or more trailers within the one or more images.

* * * * *